123,240

UNITED STATES PATENT OFFICE.

JOHN G. COFFIN, OF PORTSMOUTH, OHIO, ASSIGNOR TO SENSITIZED PAPER COMPANY, OF SAME PLACE.

IMPROVEMENT IN SENSITIZED PHOTOGRAPHIC PAPER.

Specification forming part of Letters Patent No. 123,240, dated January 30, 1872.

SPECIFICATION.

I, JNO. G. COFFIN, of Portsmouth, county of Scioto, State of Ohio, have invented certain Improvements in Sensitized Paper, of which the following is a specification:

Sensitized paper as now prepared has first to be silvered, then dried, and then subjected to chlorine gas, making three separate operations, which, in hot weather, is a serious objection, as the paper is liable to turn yellow before it can be dried, pressed, and made ready for the chlorine gas; the chlorine gas, too, being very troublesome and injurious to those using it.

With my improvement the paper is finished at one operation, which is, consequently, much more neat, as every handling musses the paper more or less.

*General Description.*

I use four baths, the first being the silver or sensitizing bath, consisting of water and nitrate of silver, at a strength, varying with the temperature of the atmosphere, from twenty-five to forty-five grains nitrate of silver to the ounce of pure water; the second bath being pure water to take up the superfluous silver; third bath being one-half ounce of chemically pure muriatic acid to the gallon pure water. Fourth bath consists of pure water to wash out the acid from the paper.

The paper to be sensitized is floated on the first two baths and immersed in the last two. The third bath, with muriatic acid, converts the nitrate of silver into chloride, which is a stable salt.

*Claim.*

I claim as my invention—

The application of dilute muriatic acid to the nitrate surface.

JNO. G. COFFIN.

Attest:
   WM. P. REILLY,
   D. K. BALL.